United States Patent [19]
Berge et al.

[11] Patent Number: 5,821,957
[45] Date of Patent: Oct. 13, 1998

[54] METHOD OF INK JET PRINTING USING COLOR FORTIFICATION IN BLACK REGIONS

[75] Inventors: Thomas G. Berge; Roopa Pathak, both of Camas, Wash.

[73] Assignee: Hewlett-Packard Company, Palo Alto, Calif.

[21] Appl. No.: 803,849

[22] Filed: Feb. 28, 1997

Related U.S. Application Data

[63] Continuation of Ser. No. 396,855, Mar. 1, 1995, abandoned.
[51] Int. Cl.⁶ .................. B41J 2/21; B41J 2/145; B41J 2/15
[52] U.S. Cl. ............................. 347/43; 347/40
[58] Field of Search .................. 347/43, 40, 100, 347/15

[56] References Cited

U.S. PATENT DOCUMENTS

| | | | |
|---|---|---|---|
| 5,057,852 | 10/1991 | Formica et al. | 347/43 |
| 5,371,531 | 12/1994 | Rezanka et al. | 347/43 |
| 5,428,377 | 6/1995 | Stoffel et al. | 347/15 |
| 5,455,610 | 10/1995 | Harrington | 347/43 |

FOREIGN PATENT DOCUMENTS

| | | | |
|---|---|---|---|
| 580449 | 1/1994 | European Pat. Off. | 347/43 |
| A0595650 | 5/1994 | European Pat. Off. | B41J 2/21 |
| A0590852 | 6/1994 | European Pat. Off. | H04N 1/46 |
| A7125408 | 5/1995 | Japan | B41M 5/00 |

*Primary Examiner*—N. Le
*Assistant Examiner*—Thinh Nguyen

[57] ABSTRACT

A method of operating an ink jet printing mechanism to print onto a printable surface an image having a solid black portion occupying a selected region, and a color portion abutting the black portion. The method comprises printing a first plurality of color ink dots of a first color onto the selected region and after printing the color ink dots, printing black ink onto the selected region to generate the solid black portion. The color printing need not entirely be printed before any black is printed, and may be printed as a uniform, partial density pattern coextensive with the black regions.

20 Claims, 3 Drawing Sheets

METHOD OF INK JET PRINTING USING COLOR FORTIFICATION IN BLACK REGIONS

This is a continuation of application Ser. No. 08/396,855 filed on Mar. 1, 1995, now abandoned.

FIELD OF THE INVENTION

This invention relates to ink jet printing, and more particularly to ink jet printing using color and black inks.

BACKGROUND AND SUMMARY OF THE INVENTION

Ink jet printing mechanisms use pens that shoot droplets of colorant onto a printable surface to generate an image. Such mechanisms may be used in a wide variety of applications, including computer printers, plotters, copiers, and facsimile machines. For convenience, the concepts of the invention are discussed in the context of a printer.

Color ink jet printers generally use cyan, yellow, and magenta inks to generate a full range of colors in a printed image. Black ink is used to generate portions of the output containing text and other black images, and to enhance the appearance of color image tones. In existing designs, the color cartridge typically has three short elongated arrays of nozzles, one for each color, while the black cartridge has a single, much longer high resolution array, permitting faster printing rates when no color is present.

When printing color images that include black portions, the different inks may interact with each other to generate unwanted image defects. A particular defect known as "halo" occurs at the edge of a printed black region that is adjacent to a printed color region. The halo appears as a gap or density loss within the black image just inward of the black edge.

Color and black inks are often selected to have different but compatible characteristics that avoid most undesirable interactions. These characteristics include rate of penetration, density of pigmentation, dry time, and water fastness. Inks may be formulated to avoid halo, but these formulations may compromise other important ink characteristics. Existing printing techniques to minimize halo include printing with additional overlapping multiple passes of partial density, heating of the print media, and/or pausing to facilitate drying between printing passes. These approaches are more expensive, or undesirably reduce printing speed.

The apparatus and method disclosed herein overcomes the above disadvantages by providing a method of operating an ink jet printing mechanism to print onto a printable surface an image having a solid black portion occupying a selected region, and a color portion abutting the black portion. The method comprises printing a first plurality of color ink dots of a first color onto the selected region and After printing the color ink dots, printing black ink onto the selected region to generate the solid black portion. The color printing need not entirely be printed before any black is printed, and may be printed as a uniform, partial density pattern coextensive with the black regions.

DETAILED DESCRIPTION OF THE PREFERRED EMBODIMENT

Figure 1:
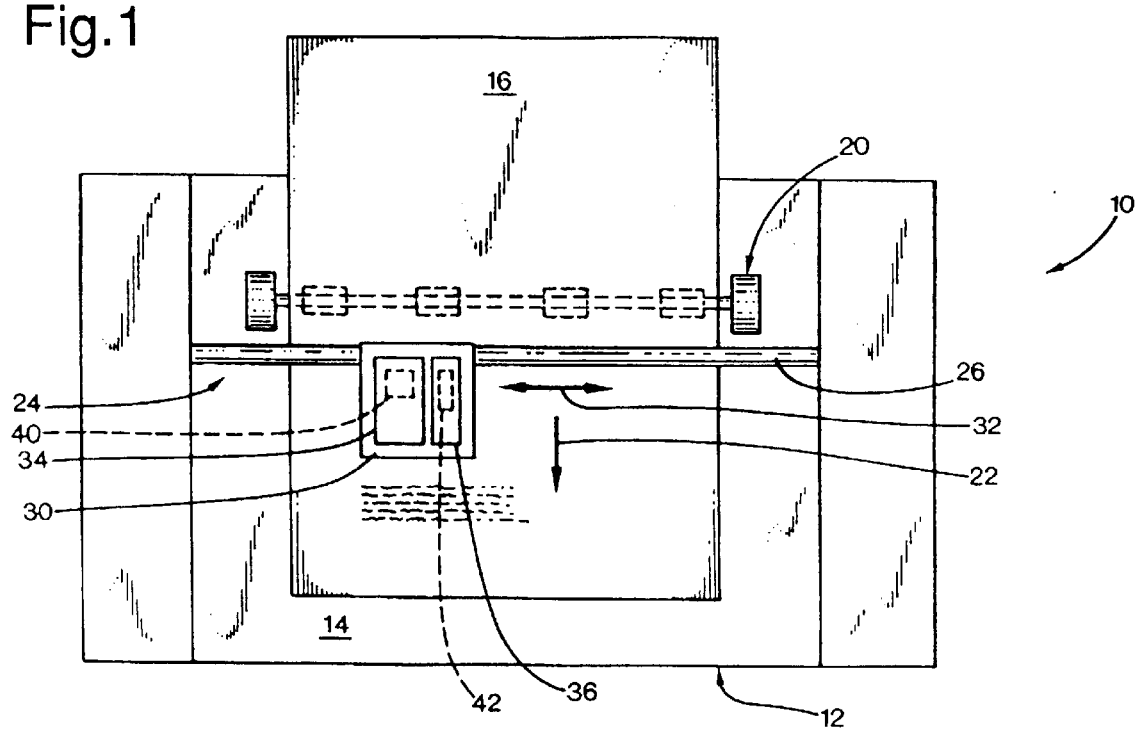
FIG. 1 Is a simplified schematic view of a printer suitable for performing printing according to a referred embodiment of the invention.

FIG. 1 illustrates a printer 10 shown in simplified schematic form for clarity. The printer 10 includes a base 12 including a media platen 14 on which a media sheet 16 may rest, and over which the sheet may pass. A paper advance mechanism 20 having feed rollers that grip the sheet 16 operates to selectably advance the sheet in a downstream direction along an advance axis indicated by arrow 22 during printing and feeding of the sheet.

A printing mechanism 24 mounted to the base 12 includes an elongated guide 26 that is spaced above the platen 14, and oriented parallel to the advance axis 22. The guide 26 is positioned downstream of the feed mechanism 20. The printing mechanism 24 includes a print head carriage 30 mounted to the guide 26 to reciprocate along the guide while constrained against rotation or translational motion other than parallel to the guide. A carriage drive mechanism (not shown) is connected to the carriage 30 for precisely moving and positioning the carriage along a print path on a scan axis perpendicular to the advance axis and indicated by arrow 32. A controller (not shown) is operably connected to the printing mechanism, feed mechanism, and data source to which the printer is connected.

A replaceable color print head 34 containing color ink and a replaceable black print head 36 containing black ink are securely mounted on the carriage 30. Together, the color and black print heads may be considered as a single print head; in an alternative embodiment, the print heads may be thus integrated. The print heads 34, 36 include on their lower surfaces (hidden in FIG. 1) a pair of orifice plates 40, 42 oriented parallel to and facing the platen 14. The orifice plates 40, 42 are shown in detail in FIG. 2. The plates are not shown as they would normally appear from below, but are shown in mirror image, or as seen through the top of the cartridge toward the media sheet.

Figure 2:
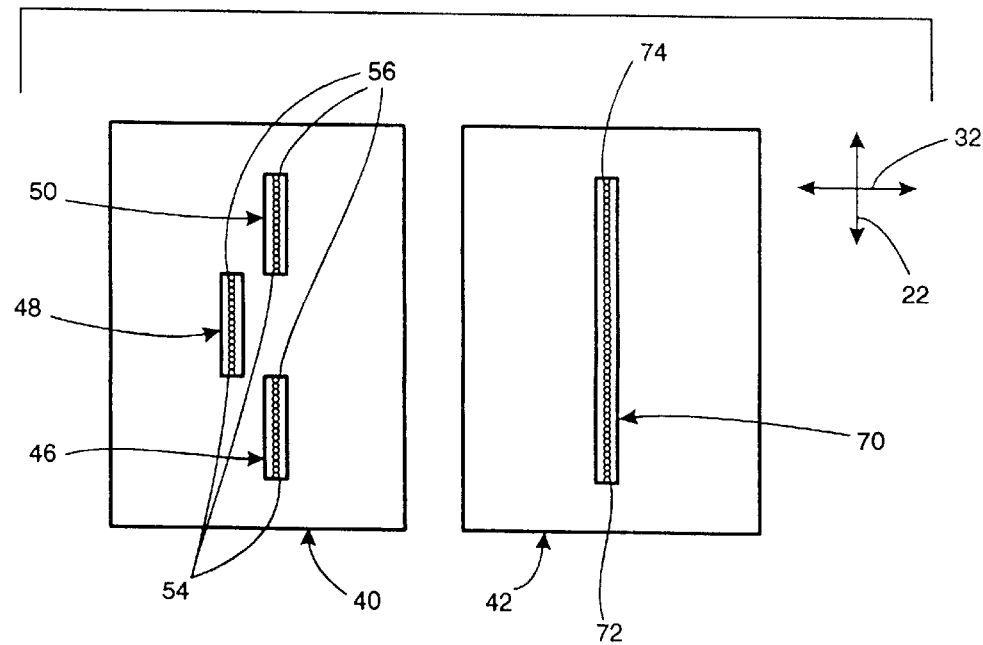
FIG. 2 is an enlarged schematic view of the print heads of the printer of FIG. 1.

As shown in FIG. 2, the color plate 40 (on the color print head 34) includes three linear color nozzle arrays 46, 48, 50, each emitting a different color of ink (yellow, magenta, and cyan respectively.) The arrays are parallel to each other and perpendicular to the scan axis 32. Each array has a downstream end 54 and an upstream end 56. The arrays are arranged serially, with the downstream end of the magenta array 48 at a level just above the upstream end of the yellow array 46, and the cyan array similarly just upstream of the magenta array. The magenta array is offset to the left of the other arrays to avoid physical interference between arrays, and to enhance manufacturability. Each color array 46, 48, 50 comprises a plurality of nozzles 66 defined in the orifice plate 40. The resolution or dot pitch of each color array is 300 dots per inch (11.8 dots/mm.) The total length of each color array is 0.054 inch (1.36 mm,) permitting the printing of a swath of up to that width with a single pass of the print head over the media sheet.

On the black print head 36, the black orifice plate 42 includes a single black nozzle array 70 of forty eight nozzles with a dot pitch of 300 dots per inch (11.8 dots/mm,) for an overall effective length or swath width of 0.160 inch (4.06 mm.)

The black plate 42 is accurately positioned with respect to the color plate 40, with mechanical registration points ensuring precise alignment. The black array 70 has a downstream end 72 registered with the downstream end of the yellow array 46, and has an upstream end 74 registered with the upstream end of the cyan array 50. Thus, if all nozzles of all arrays were to be operated on a single pass, the three colors would be printed in equal abutting stripes, and the black swath would be coextensive with the entire color swath.

Normal printing may include color regions in which each of the three colors may be printed in any amount and proportion ranging from to none to solid coverage, generating a full spectrum of image colors. Dark or black output in color regions is generally provided by printing all three color at high density. Alternatively, black ink may be added or substituted. Normal printing may also include black regions of solid black printing without any color. These are printed using only black ink to provide a true black output and to conserve color ink.

Halo problems occur when a color region abuts a black region, such as a color half tone image within a black frame, color text on a black background, or large black text on a color background. To avoid these problems, the preferred method prints some color ink to the black regions before most of the black ink is printed. This sufficiently moderates the otherwise problematic interactions across boundaries between the color and black regions.

FIGS. 3a–3e show the steps employed to print an image having color and solid black regions that abut each other. Each of the figures shows a square image window 80 that represents a small area of a printable surface at a particular stage of printing a sample image on the surface. The window 80 is a nine by nine matrix of image pixels 82, each of which represents a location on which one or more ink droplets may be printed. Although individual droplets tend to generate circular images on the surface, each nonetheless effectively obscures an entire pixel, and is shown as a square for clarity.

The sample image in the window 80 includes a color region 84 at the lower left of the window, and a black region 86 in the upper and right remaining portions of the window. An imaginary boundary line 88 divides the two regions. It is adjacent to this line, in the black region 86 that halo image defects normally occur in the prior art. In the illustrated example, the color region will being shown as printed only with yellow ink, although the other colors would often be used in practice. The sample image reflects a portion of a yellow letter printed against a black background.

Each figure includes two windows 80, the left window showing printing of color ink on one pass of the print head, and the right window showing the printing of black ink on the return pass or retrace. Below each window is a scan arrow 90 indicating the direction the print head is moving along the scan axis during current printing. To the right of the windows, an advance arrow 92 shows the direction and magnitude by which the printable surface is advanced after the printing shown in the windows, To the left of the left window, the color nozzle arrays 46, 48, 50 are shown in their current relative position with respect to the window on the illustrated pass. To the left of the right window, the black array 70 is similarly shown. In the simplified illustrations, the color arrays are shown as extending to a length equal to only three pixels each instead of the actual sixteen; the black array is shown with nine instead of the actual forty eight. This simplification is for clarity only, and the method may be achieved with arrays of any dimension while following the principles of the invention.

OPERATION

Figure 3A:
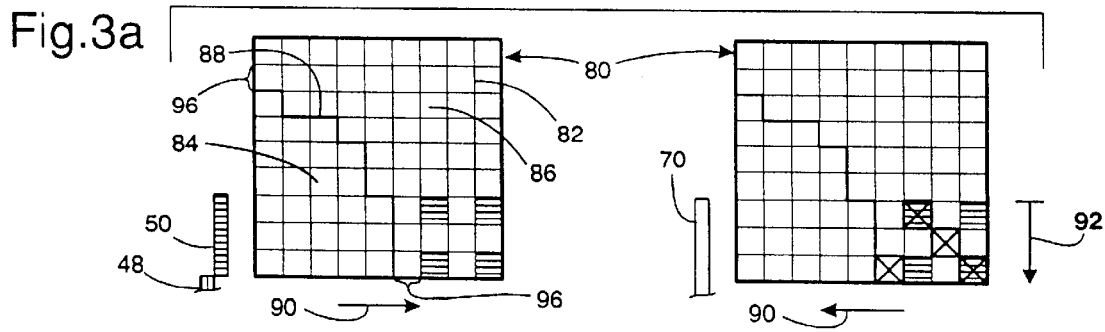
FIGS. 3a–3e are schematic views of the sequence of operation of the printer of FIG. 1 showing a printed output at sequential steps of printer operation.

In FIG. 3a, the sheet has advanced so that the lower third of the window is registered with the cyan array 50 and with the upper third of the black array 70. On the first scan shown in the left window, the entire cyan array 50 is active, and prints any required ink to the color region 84 (in this example, none will be required,) and prints a pattern of ink to the black region 86. The pattern comprises an orthogonal array of double spaced dots. That is, the cyan dots are arranged in rows and columns that alternate with single rows and columns in which no cyan dots will be printed. This generates a 25% density of cyan printing in the black region, all of which is printed before any black ink is printed. For each two by two block of pixels in the black region 86, one cyan dot is printed. A margin 96 at the periphery of the black region includes all pixels in the black region that are orthogonally or diagonally adjacent to the boundary line 88. No color dots are printed in the margin to prevent color bleed into the color region, and to avoid a fringe of color visible beneath overprinted black dots. Preferably, the margin is at least 1/300 inch wide (0.085 mm.) In this and subsequent figures, cyan is shown with horizontal hatching, magenta with vertical hatching, yellow with grid hatching, and black with dark "X" symbols or solid hatching.

In the right window of FIG. 3a, the black array prints the lower third of the window with 33% density. This provides for a multipass "shingling" of the black printing to reduce undesirable image artifacts for improved image quality. Although a 33% or three pass shingling technique has one third the printing speed compared to printing full swaths with all the black nozzles, this is not a concern when printing color images, as color printing necessarily requires the reduced rate due to the smaller color nozzle arrays. In the illustrated example, the black dots are printed in diagonal lines spaced apart by two unprinted pixels to provide the 33% density. Alternatively, the dots may be printed in every third row or column, or in a variety of other patterns. After the printing in FIG. 3a is complete, the printable surface is advanced by the distance shown by arrow 92, or a distance equal to the length of a color array (3 pixels in the illustration, 16 pixels in the preferred embodiment.)

Figure 3B:
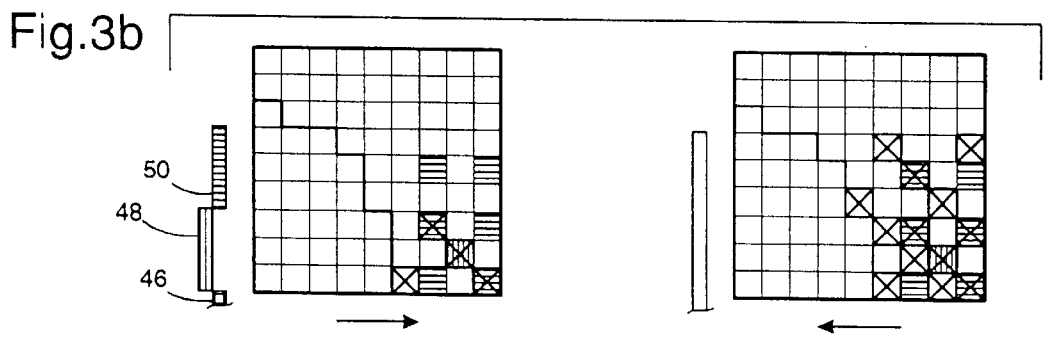

In FIG. 3b, the cyan array 50 is registered with the middle third of the window, and the magenta array 48 is registered with the lower third. While scanning to the right, the cyan array prints dots onto the black region according to the 25% density matrix begun in FIG. 3a, while avoiding the margin 96. Magenta dots are printed to the lower third of the black region, avoiding the margin as will all other color printing to the black region. The magenta dots are printed on a 25% density matrix similar to the cyan matrix, but offset diagonally by one pixel. This provides a checkerboard pattern of uncolored pixels alternating with cyan or magenta colored pixels. Although the lower third of the window has been printed with 33% density black, two thirds of the magenta pixels will normally print onto white space. This is a sufficient quantity to provide the desired effect of conditioning the printable surface to prevent halo effects. The checkerboard pattern cyan and magenta may also be provided by alternating diagonal rows of each color, interspersed with intervening diagonal unprinted rows to reduce the sensitivity of the pattern to a single out nozzle.

Figure 3C:
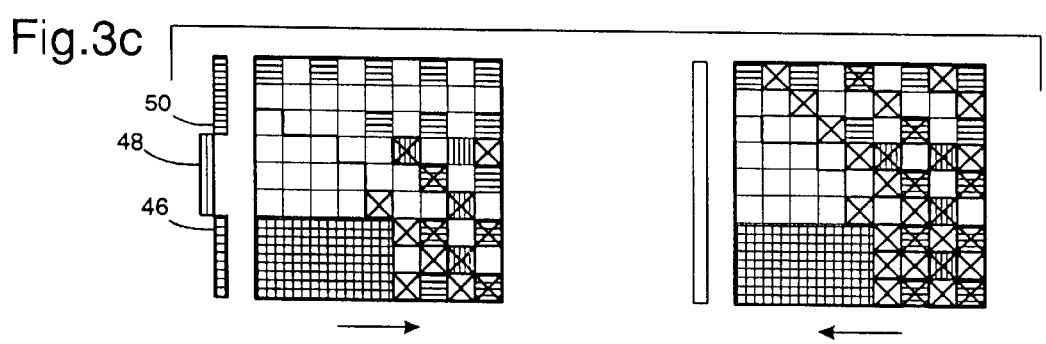

In the right window of FIG. 3b, on a leftward retrace scan, the black array 70 prints a 33% density swath to the lower two thirds of the window, resulting in 33% density in the middle third, and 67% density in the lower third. The diagonal pattern of the second retrace is offset by one pixel to the left from the first retrace so that the FIG. 3b retrace covers pixels not already printed with black dots. A standard advance of one color array length is then provided. In FIG. 3c, the color arrays and black array are fully registered with the window. On the first scan, cyan prints in the same matrix pattern to the upper third of the black region, while magenta continues its pattern in the middle third. The yellow array prints onto the pixels of the lower third of the color region to provide the selected example image.

On the retrace, the entire black region is printed with the 33% density pattern shifted another pixel to the left, completing the solid black printing to the lower third, providing 67% density black to the middle third, and 33% density to the upper third. The printable surface is then advanced by the standard amount.

Figure 3D:
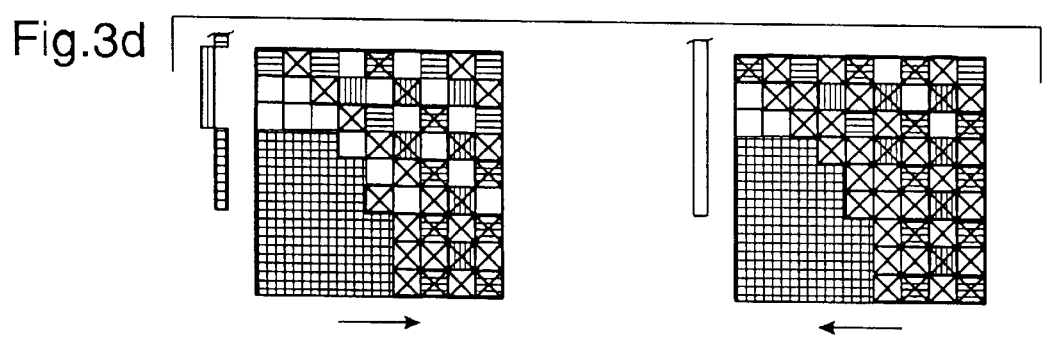

In FIG. 3d, the middle third of the window is printed with yellow, and the magenta color under printing of the black region is completed in the upper third. On the retrace, The middle portion of the black region is completed, and the upper third is brought up to 67% density. During these scans, the cyan array and the upper portion of the black array are registered with areas of the printable surface beyond the window, and may continue actively printing those areas. During steady state printing of a large area, all portions of all arrays are active to provide ink droplets as needed. A standard advance is then effected after the scan and retrace of FIG. 3d.

Figure 3E:
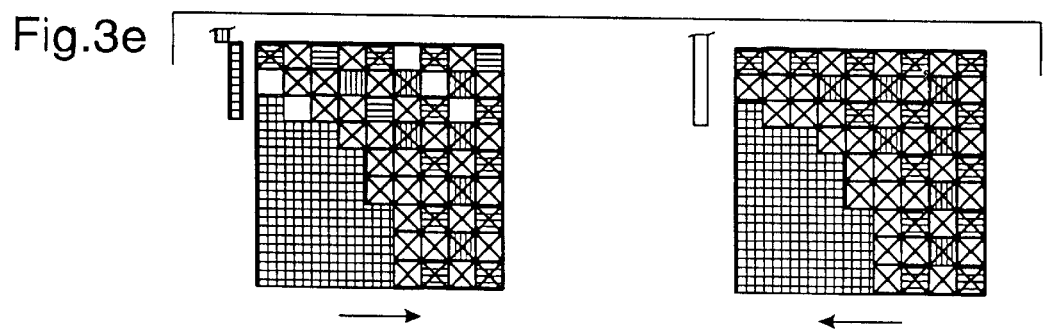

In FIG. 3e, the color region is completed with yellow printing, as is the black region with black printing.

Figure 4:
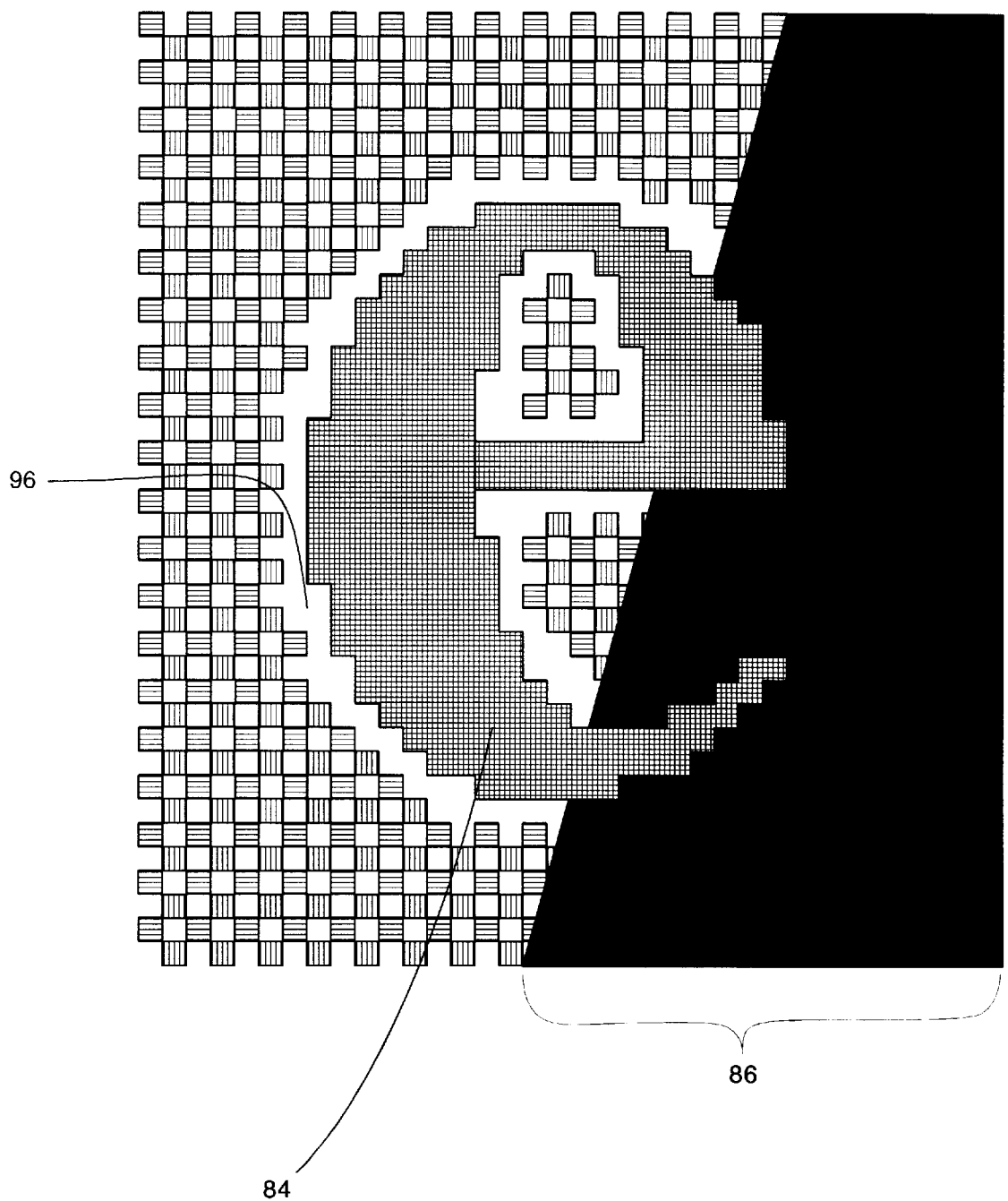
FIG. 4 is an enlarged view of a printed output according to the present invention.

FIG. 4 shows a larger printed section of the sample output as printed in FIGS. 3a–3e. The black region 86 is shown with part of the black printing cut away to reveal the cyan and magenta checkerboard pattern beneath. The margins 96 are one pixel wide, although they might be made wider in some applications. The margins appear in some areas to be two pixels wide, but this is only an illusion that occurs when the white pixels of the checkerboard pattern are adjacent the margin.

A computer printer operating according to the present invention will process image data from the computer and convert it to the simple instructions as to where dots of each color are to be printed. The RGB data normally used for a display device is remapped according to predetermined characteristics of the printer and inks employed so that the printed image reflects the displayed image as accurately as possible. The printer controller determines whether the data includes color. If not, the gray scale or black image is "half toned," or converted to a pattern of black dots or shapes to provide a facsimile of the image.

If the image contains color, it is analyzed to determine if there is a color region abutting a solid black region. If so, the image is printed with color fortification of the solid black regions as discussed above. Specifically, the black regions are half toned to generate the solid shapes, with the color fortification pattern added as a post process following the separation of black data abutting color data from black data not abutting color data. If there are no regions of color abutting solid black, the color regions may be half toned and the black regions printed without fortification since haloing is not a concern.

While the invention is described in terms of a preferred embodiment, variations may be made without departing from the spirit and scope of the invention as claimed below.

We claim:

1. A method of generating on a printable surface a printed image having a black region abutting a color region, the black region having a peripheral portion abutting the color region and a central portion of the black region abutting the peripheral portion and spaced apart from the color region by the width of the peripheral region, the method comprising the steps:

printing color ink droplets to the color region;
   printing a fortification pattern of color ink droplets to the central portion of the black region;
   printing black ink droplets to the black region to overlay the black region.

2. The method of claim 1 wherein printing black droplets comprises printing black ink droplets to be coextensive with each of the droplets of the fortification pattern such that the color droplets are not visible.

3. The method of claim 1 wherein printing black droplets comprises printing black ink droplets to overlay at least some of the droplets of the fortification pattern.

4. The method of claim 1 wherein printing black droplets comprises printing black ink droplets to overlay a substantial portion of the droplets of the fortification pattern.

5. The method of claim 1 wherein printing black droplets comprises printing black ink droplets after printing at least some of the droplets of the fortification pattern.

6. The method of claim 1 wherein printing black droplets comprises printing black ink droplets in a uniform orthogonal matrix of pixels, each pixel being overprinted with a black droplet.

7. The method of claim 1 wherein printing a fortification pattern includes generating a uniform array of color droplets.

8. The method of claim 1 wherein the central portion of the black region is spaced apart from the color region by a margin in which no color droplets are printed and within which black droplets are printed, such that each color droplet in the color region is spaced apart from all color droplets in the black region, and the black region abuts the color region while the fortification pattern of color ink droplets is spaced apart from the color region.

9. The method of claim 1 wherein printing a fortification pattern occurs before a major portion of the black droplets are printed to the black region.

10. A method of operating an ink jet printing mechanism to print onto a printable surface an image having a black portion occupying a selected region, the image having a color portion abutting the black portion, the black portion having a peripheral portion abutting the color portion, and the black portion having a central portion abutting the peripheral portion and spaced apart from the color portion by the width of the peripheral portion, the method comprising the steps:

printing a selected plurality of color ink dots of a selected color onto the central portion of the selected region, at least some of the central portion being spaced apart from the color portion; and
   after printing the color ink dots, printing black ink onto the central portion of the selected region to generate the black portion.

11. The method of claim 10 including the step of printing a second plurality of color ink dots of a second different color onto the selected region after printing at least a first portion of the black ink, and wherein the step of printing black ink includes printing at least a second portion of the black ink after printing the second color.

12. The method of claim 10 including printing a second plurality of color ink dots, each of the second plurality being printed to a location not occupied by a dot of the selected plurality of color ink dots.

13. The method of claim 12 wherein the step of printing black ink includes printing at least some of the black ink after printing the second color ink dots.

14. The method of claim 10 wherein each color dot is printed at a unique position such that they do not substantially overlap.

15. The method of claim 10 wherein the color dots are evenly distributed throughout substantially the entire selected region.

16. The method of claim 15 wherein the color dots are arranged in a checkerboard pattern to provide 50% density of color printing.

17. The method of claim 10 wherein the step of printing color dots to the selected region includes printing the color dots only to a limited inner region separated from the color portion by a margin in which no color dots are printed.

18. The method of claim 17 wherein the margin is at least one pixel wide such that color dots in the selected region do not orthogonally or diagonally abut color dots in the color region.

19. A printing system that prints on a printable surface based on print data, the system comprising:

a controller;

a printable surface advance mechanism in communication with the controller;

a carriage scanning assembly in communication with the controller;

a print head connected to the carriage scanning assembly and in communication with the controller;

the controller being programmed to print color ink droplets to a color region on the printable surface, to print a fortification pattern of color ink droplets to a black region abutting the color region, the black region having a peripheral portion abutting the color region and a central portion of the black region abutting the peripheral portion and spaced apart from the color region, the controller being programmed to print color ink droplets to the central region, and to print black ink droplets to the black region to overlay the black region.

20. A method of operating an ink jet printing mechanism having a scan axis along which a print head is reciprocated and an advance axis perpendicular to the scan axis and along which a printable surface is advanced in a downstream direction relative to the printing mechanism, the print head including an array of black nozzles and a plurality of color nozzle arrays, the color nozzle arrays including a first color nozzle array in communication with a supply of a first color ink, a second nozzle array in communication with a supply of a second color ink and positioned downstream of the first nozzle array, and a third nozzle array in communication with a supply of a third color ink and positioned downstream of the second nozzle array, a method of printing a solid black image onto a black region of a selected portion of the printable surface, the black region having a peripheral portion and an abutting central portion, and printing a color image onto a color region of the selected portion of the printable surface abutting the peripheral portion of the black region and spaced apart from the central portion of the black region, the method including the steps:

while moving the print head along the scan axis, printing the first color ink onto at least a portion of the selected portion;

after printing the first color ink, advancing the printable surface in the downstream direction by an incremental amount;

after advancing, printing the second color ink onto at least a portion of the selected portion;

after printing the second color ink, advancing the printable surface in the downstream direction by the incremental amount;

after advancing, printing the third color ink onto at least a portion of the selected portion;

at least some of a colored ink selected from a group of color inks comprising the first color ink, the second color ink, and the third color ink being printed onto the central portion of the black region of the selected portion; and after printing at least some of the colored ink, printing black ink onto the black region.

* * * * *